US009057480B1

(12) United States Patent
Florey (10) Patent No.: US 9,057,480 B1
(45) Date of Patent: Jun. 16, 2015

(54) COLLAPSIBLE CAMERA CRANE (71) Applicant: Lite Pro Gear, Zephyr Cove, NV (US)

(72) Inventor: Canyon Florey, South Lake Tahoe, CA (US)

(73) Assignee: LITE PRO GEAR, Zephyr Cove, NV (US)

( * ) Notice: Subject to any disclaimer, the term of this patent is extended or adjusted under 35 U.S.C. 154(b) by 0 days.

(21) Appl. No.: 14/222,525

(22) Filed: Mar. 21, 2014

Related U.S. Application Data (63) Continuation of application No. 29/473,730, filed on Nov. 25, 2013.

(51) Int. Cl.
| | | |
|---|---|---|
| *F16M 11/00* | (2006.01) | |
| *F16M 11/18* | (2006.01) | |
| *F16M 13/02* | (2006.01) | |
| *F16M 11/42* | (2006.01) | |
| *F16M 11/20* | (2006.01) | |

(52) U.S. Cl.
CPC ............. *F16M 11/18* (2013.01); *F16M 13/022* (2013.01); *F16M 11/42* (2013.01); *F16M 2200/044* (2013.01); *F16M 11/2064* (2013.01); *F16M 11/425* (2013.01)

(58) Field of Classification Search
CPC ......... H04R 1/08; F16M 11/10; F16M 11/18; F16M 11/42; F16M 11/24; F16M 11/12; F16M 11/2064; F16M 11/425; F16M 2200/044; F16M 2200/041; B66F 11/048; G03B 17/56
USPC ......... 248/285.1, 123.11, 176.1, 280.11, 364, 248/298.1; 396/428; 352/243; D16/242
See application file for complete search history.

(56) References Cited

U.S. PATENT DOCUMENTS

| | | | | |
|---|---|---|---|---|
| 1,942,925 A | * | 1/1934 | Jenkins ...................... | 248/123.2 |
| 4,370,090 A | * | 1/1983 | Shumaker et al. ............ | 414/694 |
| 4,671,478 A | * | 6/1987 | Schoenig et al. .......... | 248/124.1 |
| 4,849,778 A | * | 7/1989 | Samuelson ................... | 396/428 |
| 4,907,768 A | * | 3/1990 | Masseron et al. ......... | 248/123.11 |
| 5,711,397 A | * | 1/1998 | Flora et al. ........................ | 182/3 |
| 5,856,862 A | * | 1/1999 | Kokush .......................... | 352/243 |
| 6,478,427 B1 | * | 11/2002 | Morris et al. ................. | 352/243 |
| 6,752,541 B1 | * | 6/2004 | Dykyj ............................ | 396/428 |
| 7,293,668 B2 | * | 11/2007 | Brossart et al. ................ | 212/177 |
| D588,621 S | | 3/2009 | Baty ............................ | D16/242 |

* cited by examiner

*Primary Examiner* — Anita M King
(74) *Attorney, Agent, or Firm* — Pillsbury Winthrop Shaw Pittman LLP (57) ABSTRACT

A lightweight compact collapsible camera crane may comprise a tubular boom having segments arranged in a telescopic configuration such that the boom is transformable between an extended configuration and a collapsed configuration. A boom-end bracket may be removably and hingedly connected to a distal end of the boom. The boom-end bracket may include a camera seat configured to support a camera. A tower may be removably and hingedly connected to an intermediate position along the boom such that during use a downward motion of a proximal end of the boom results in an upward motion of the distal end of the boom and an upward motion of the proximal end of the boom results in a downward motion of the distal end of the boom. A removable actuator cable may mechanically couple the tower and the boom-end bracket to maintain an orientation of the camera seat.

20 Claims, 7 Drawing Sheets

COLLAPSIBLE CAMERA CRANE

CROSS REFERENCE TO RELATED APPLICATIONS

The present application claims the priority benefit of U.S. design patent application Ser. No. 29/473,730 filed Nov. 25, 2013 and entitled "Collapsible Camera Crane," the disclosure of which in its entirety being incorporated herein by reference.

FIELD OF THE DISCLOSURE

This disclosure relates to a collapsible camera crane.

SUMMARY

One aspect of the disclosure relates to a lightweight compact collapsible camera crane. The collapsible camera crane may comprise a tubular boom having segments arranged in a telescopic configuration such that the boom is transformable between an extended configuration and a collapsed configuration. Collared flip locks may be disposed at one end of individual segments. A given collared flip lock may be configured to lock two adjacent segments to restrict relative motion between the two adjacent segments. The two adjacent segments may be lockable in at least an extended configuration or a collapsed configuration. A boom-end bracket may be removably and hingedly connected to a distal end of the boom. The boom-end bracket may include a camera seat configured to support a camera. A tower may be removably and hingedly connected to an intermediate position along the boom such that during use a downward motion of a proximal end of the boom results in an upward motion of the distal end of the boom and an upward motion of the proximal end of the boom results in a downward motion of the distal end of the boom. A removable actuator cable may mechanically couple the tower and the boom-end bracket to maintain an orientation of the camera seat. A jib handle may be disposed at the proximal end of the boom.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
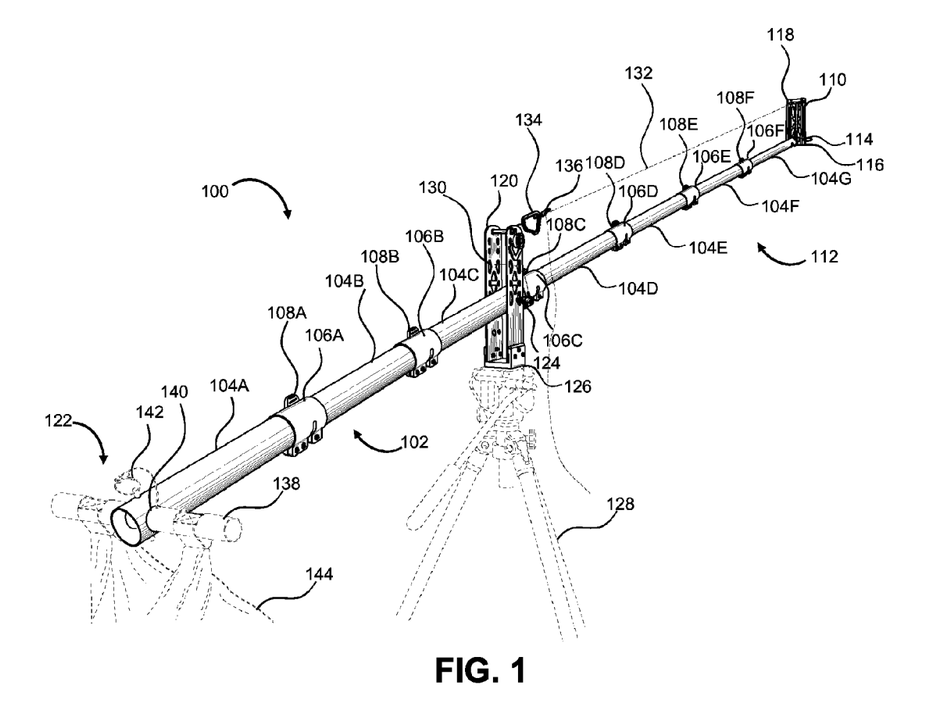
FIG. 1 is a perspective view of a collapsible camera crane, illustrated in an extended configuration.
Figure 2:
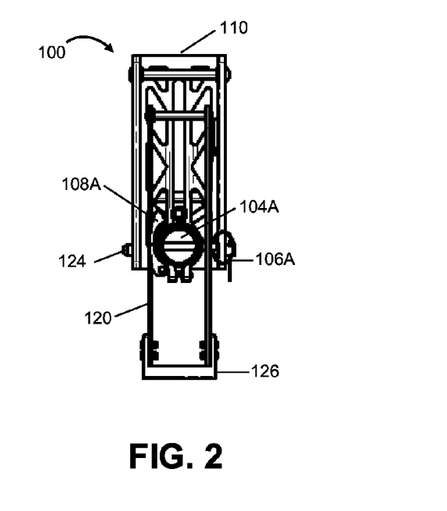
FIG. 2 is a rear elevational view of the collapsible camera crane, illustrated in the extended configuration.
Figure 3:
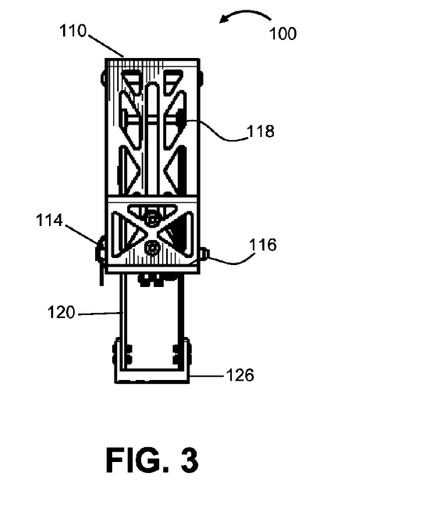
FIG. 3 is a front elevational view of the collapsible camera crane, illustrated in the extended configuration.
Figure 4:
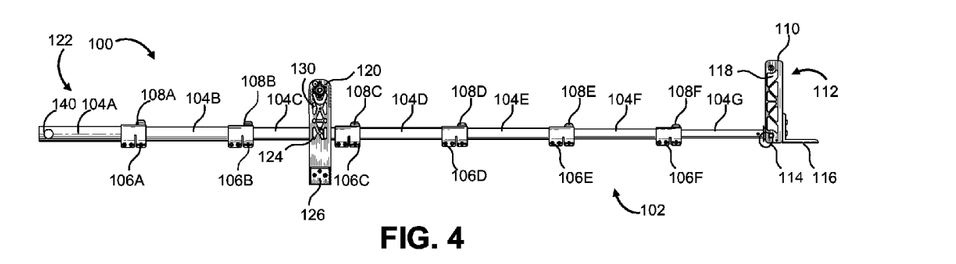
FIG. 4 is a left-side elevational view of the collapsible camera crane, illustrated in the extended configuration.
Figure 5:
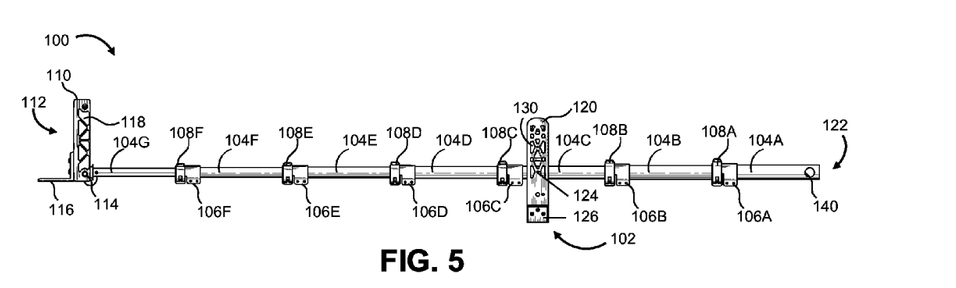
FIG. 5 is a right-side elevational view of the collapsible camera crane, illustrated in the extended configuration.
Figure 6:
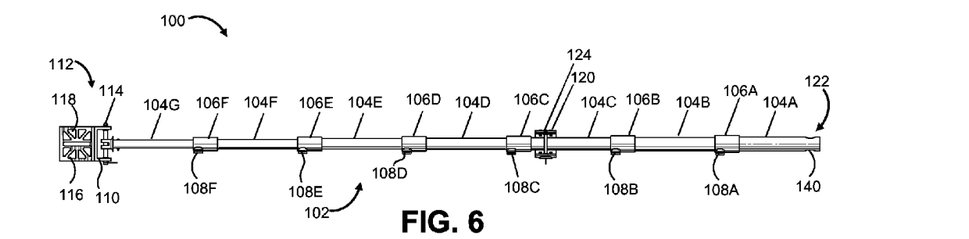
FIG. 6 is a top plan view of the collapsible camera crane, illustrated in the extended configuration.
Figure 7:
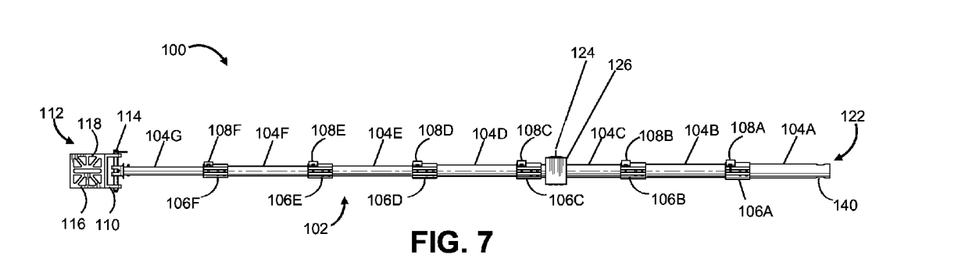
FIG. 7 is a bottom plan view of the collapsible camera crane, illustrated in the extended configuration.
Figure 8:
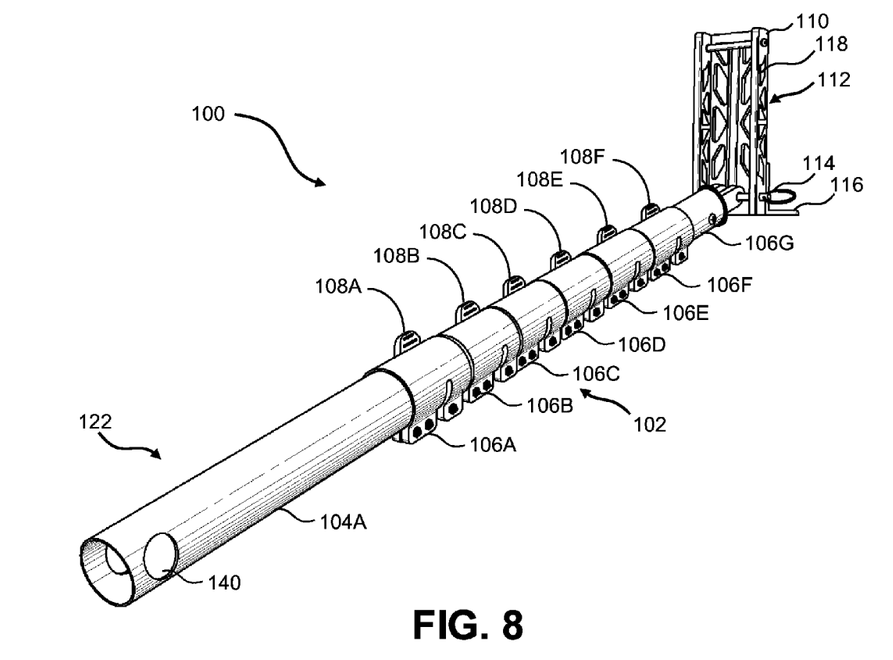
FIG. 8 is a perspective view of the collapsible camera crane, illustrated in a collapsed configuration.
Figure 9:
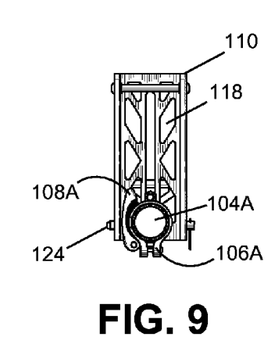
FIG. 9 is a rear elevational view of the collapsible camera crane, illustrated in the collapsed configuration.
Figure 10:
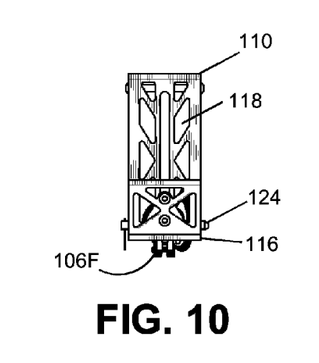
FIG. 10 is a front elevational view of the collapsible camera crane, illustrated in the collapsed configuration.
Figure 11:
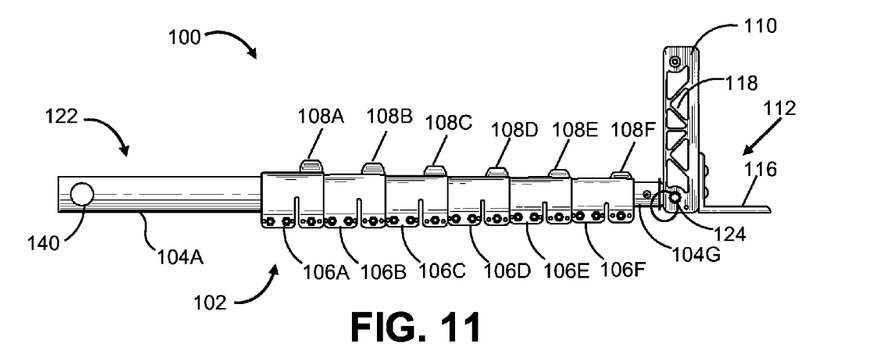
FIG. 11 is a left-side elevational view of the collapsible camera crane, illustrated in the collapsed configuration.
Figure 12:
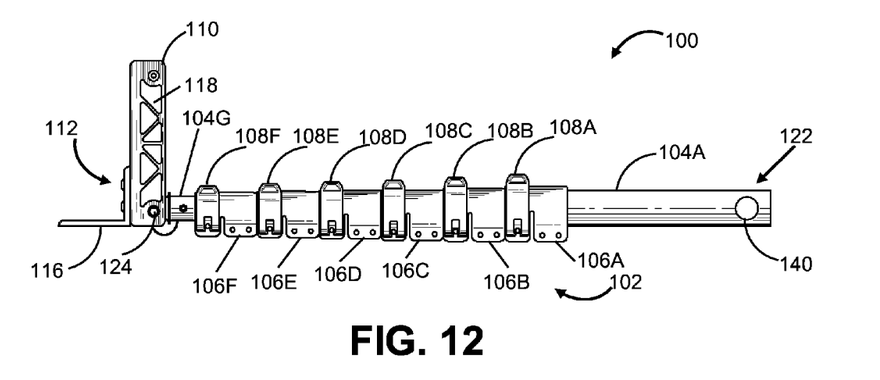
FIG. 12 is a right-side elevational view of the collapsible camera crane, illustrated in the collapsed configuration.
Figure 13:
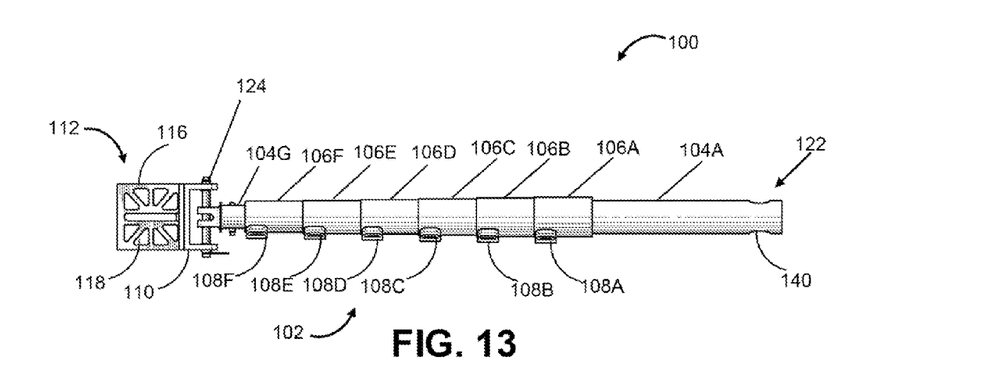
FIG. 13 is a top plan view of the collapsible camera crane, illustrated in the collapsed configuration.
Figure 14:
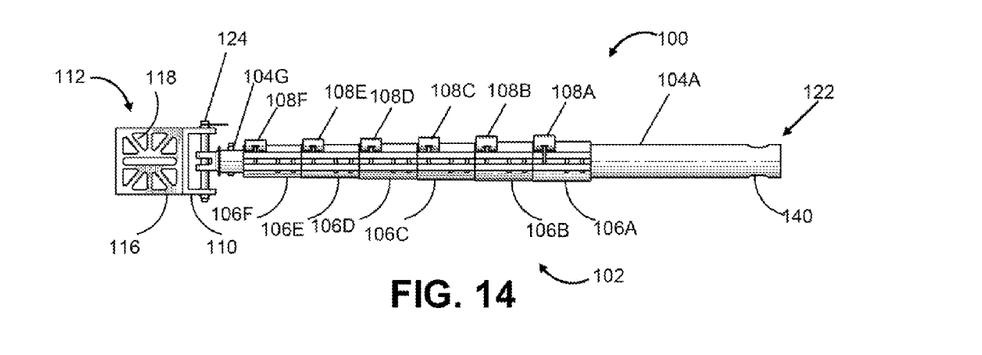
FIG. 14 is a bottom plan view of the collapsible camera crane, illustrated in the collapsed configuration.

A lightweight compact collapsible camera crane may include a boom having segments arranged in a telescopic configuration such that the boom is transformable between an extended configuration and a collapsed configuration. FIG. 1 is a perspective view of a collapsible camera crane 100, illustrated in an extended configuration. FIGS. 2-7 show collapsible camera crane 100 in the extended configuration in several views including a rear elevational view in FIG. 2, a front elevational view in FIG. 3, a left-side elevational view in FIG. 4, a right-side elevational view in FIG. 5, a top plan view in FIG. 6, and a bottom plan view in FIG. 7. FIG. 8 is a perspective view of collapsible camera crane 100, illustrated in a collapsed configuration. FIGS. 9-14 show collapsible camera crane 100 in the collapsed configuration in several views including a rear elevational view in FIG. 9, a front elevational view in FIG. 10, a left-side elevational view in FIG. 11, a right-side elevational view in FIG. 12, a top plan view in FIG. 13, and a bottom plan view in FIG. 14.

The collapsible camera crane 100 may include a tubular boom 102 having segments (e.g., segments 104A, 104B, 104C, 104D, 104E, 104F, and/or 104G) arranged in a telescopic configuration such that boom 102 is transformable between an extended configuration (see, e.g., FIGS. 1-8) and a collapsed configuration (see, e.g., FIGS. 9-14). As shown, boom 102 may have seven segments arranged in the telescopic configuration. Individual ones of segments 104A, 104B, 104C, 104D, 104E, 104F, and/or 104G may be cylindrical. Some or all of segments 104A, 104B, 104C, 104D, 104E, 104F, and/or 104G may be of equal length.

The boom 102 may include collared flip locks (e.g., collared flip locks 106A, 106B, 106C, 106D, 106E, and/or 106F). Individual ones of collared flip locks 106A-106F may be disposed at one end of individual segments 104A-104F. A given collared flip lock (e.g., collared flip lock 106A) may be configured to lock two adjacent segments (e.g., segments 104A and 104B) to restrict relative motion between the two adjacent segments. The two adjacent segments may be lockable in at least an extended configuration or a collapsed configuration. A given collared flip lock (e.g., collared flip lock 106A) may include a lever (e.g., lever 108A) to lock and unlock the given collared flip lock.

The collapsible camera crane 100 may include a boom-end bracket 110. The boom-end bracket 110 may be removably and hingedly connected to a distal end 112 of the boom 102. A cotterless pull pin 114 may facilitate the removable and hinged connection between boom-end bracket 110 and boom 102. The cotterless pull pin 114 may act as a fulcrum for boom-end bracket 110 to swing along a plane relative to boom 102. During use, such a plane may be vertical and may include boom 102. The boom-end bracket 110 may include a camera seat 116 configured to support a camera (not depicted). A body of boom-end bracket 110 may include weight-reducing voids (e.g., void 118).

The collapsible camera crane 100 may include a tower 120. The tower 120 may be removably and hingedly connected to an intermediate position along boom 102. During use, a downward motion of a proximal end 122 of boom 102 may result in an upward motion of distal end 112 of boom 102 and an upward motion of proximal 122 end of boom 102 may result in a downward motion of distal end 112 of boom 102. A cotterless pull pin 124 may facilitate the removable and hinged connection between tower 120 and boom 102. The cotterless pull pin 124 may act as a fulcrum for boom 102 to rock on tower 120. The tower 120 may be removably and hingedly connected to an intermediate segment of boom 102. As shown, tower 120 may be removably and hingedly connected to segment 104C (i.e., third from proximal end 122 of boom 102 and fifth from distal end 112 of boom 102). The tower 120 may include a tower bottom bracket 126 that is designed to be removably and pivotably connected to a photographic tripod 128. A body of tower 120 may include weight-reducing voids (e.g., void 130).

The collapsible camera crane 100 may include a removable actuator cable 132. The actuator cable 132 may mechanically couple tower 120 and boom-end bracket 110 to maintain an orientation of camera seat 116. For example, during use, the orientation of camera seat 116 maintained by virtue of actuator cable 132 may be approximately horizontal. A carabineer 134 may be used to removably connect actuator cable 132 to tower 120. The collapsible camera crane 100 may include a tensioning unit 136 configured to facilitate length adjustments of actuator cable 132.

The collapsible camera crane 100 may include a jib handle 138 disposed at proximal end 122 of boom 102. The boom 102 may include a jib-handle aperture 140 disposed at proximal end 122 of boom 102. The jib handle 138 may be removably disposed within jib-handle aperture 140. A cotterless pull pin 142 may facilitate a removable connection between jib handle 138 and boom 102. The jib handle 138 may be configured to support a weight bag 144.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A collapsible camera crane, comprising:
   a tubular boom having segments arranged in a telescopic configuration such that the boom is transformable between an extended configuration and a collapsed configuration;
   a boom-end bracket removably and hingedly connected to a distal end of the boom, the boom-end bracket including a camera seat configured to support a camera;
   a tower removably and hingedly connected to an intermediate position along the boom such that during use a downward motion of a proximal end of the boom results in an upward motion of the distal end of the boom and an upward motion of the proximal end of the boom results in a downward motion of the distal end of the boom;
   a removable actuator cable that mechanically couples the tower and the boom-end bracket to maintain an orientation of the camera seat; and
   a tensioning unit configured to facilitate length adjustments of the actuator cable.

2. The collapsible camera crane of claim 1, wherein individual ones of the segments are cylindrical.

3. The collapsible camera crane of claim 1, wherein the boom has seven segments arranged in the telescopic configuration.

4. The collapsible camera crane of claim 3, wherein the tower is removably and hingedly connected to an intermediate segment of the boom, the intermediate segment being third from the proximal end of the boom and fifth from the distal end of the boom.

5. The collapsible camera crane of claim 1, further comprising collared flip locks disposed at one end of individual segments, a given collared flip lock being configured to lock two adjacent segments to restrict relative motion between the two adjacent segments, the two adjacent segments being lockable in at least an extended configuration or a collapsed configuration.

6. The collapsible camera crane of claim 5, wherein a given collared flip lock includes a lever to lock and unlock the given collared flip lock.

7. The collapsible camera crane of claim 1, wherein a cotterless pull pin facilitates the removable and hinged connection between the boom-end bracket and the boom, the cotterless pull pin acting as a fulcrum for the boom-end bracket to swing along a plane relative to the boom.

8. The collapsible camera crane of claim 7, wherein the plane is vertical and includes the boom.

9. The collapsible camera crane of claim 1, wherein a body of the boom-end bracket includes weight-reducing voids.

10. The collapsible camera crane of claim 1, wherein a cotterless pull pin facilitates the removable and hinged connection between the tower and the boom, the cotterless pull pin acting as a fulcrum for the boom to rock on the tower.

11. The collapsible camera crane of claim 1, wherein the tower includes a tower bottom bracket that is designed to be removably and pivotably connected to a photographic tripod.

12. The collapsible camera crane of claim 1, wherein a body of the tower includes weight-reducing voids.

13. The collapsible camera crane of claim 1, wherein a carabineer is used to removably connect the actuator cable to the tower.

14. The collapsible camera crane of claim 1, wherein the orientation of the camera seat maintained by virtue of the removable actuator cable is approximately horizontal.

15. The collapsible camera crane of claim 1, wherein the boom includes a jib-handle aperture disposed at the proximal end of the boom.

16. The collapsible camera crane of claim 1, further comprising a jib handle disposed at the proximal end of the boom.

17. The collapsible camera crane of claim 16, wherein the jib handle is configured to support a weight bag.

18. The collapsible camera crane of claim 16, wherein the jib handle is removably disposed within a jib-handle aperture disposed at the proximal end of the boom.

19. The collapsible camera crane of claim 16, wherein a cotterless pull pin facilitates a removable connection between the jib handle and the boom.

20. A collapsible camera crane, comprising:
- a tubular boom having segments arranged in a telescopic configuration such that the boom is transformable between an extended configuration and a collapsed configuration;
- a boom-end bracket removably and hingedly connected to a distal end of the boom, the boom-end bracket including a camera seat configured to support a camera;
- a tower removably and hingedly connected to an intermediate position along the boom such that during use a downward motion of a proximal end of the boom results in an upward motion of the distal end of the boom and an upward motion of the proximal end of the boom results in a downward motion of the distal end of the boom;
- a removable actuator cable that mechanically couples the tower and the boom-end bracket to maintain an orientation of the camera seat; and
- a jib handle disposed at the proximal end of the boom, wherein a cotterless pull pin facilitates a removable connection between the jib handle and the boom.

* * * * *